(12) United States Patent
Wisgo (10) Patent No.: US 11,381,395 B2
(45) Date of Patent: Jul. 5, 2022

(54) SYSTEM AND METHODS FOR ENCRYPTION BASED ON ENVIRONMENTAL FACTORS

(71) Applicant: Citrix Systems, Inc., Ft. Lauderdale, FL (US)

(72) Inventor: Jeffrey David Wisgo, Portland, OR (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 152 days.

(21) Appl. No.: 16/809,857

(22) Filed: Mar. 5, 2020

(65) Prior Publication Data

US 2021/0281403 A1 Sep. 9, 2021

(51) Int. Cl.
*H04L 9/08* (2006.01)
*G06F 21/60* (2013.01)

(52) U.S. Cl.
CPC .......... *H04L 9/0872* (2013.01); *G06F 21/602* (2013.01)

(58) Field of Classification Search
CPC ............................ H04L 9/0872; G06F 21/602
See application file for complete search history.

(56) References Cited

U.S. PATENT DOCUMENTS

| | | | | |
|---|---|---|---|---|
| 10,817,590 B1* | 10/2020 | Daly | ..................... | H04L 9/0866 |
| 2002/0131592 A1* | 9/2002 | Hinnant | ................ | H04L 9/0662 380/46 |
| 2011/0075840 A1* | 3/2011 | Zayas | ................... | H04L 9/0662 380/46 |
| 2013/0136255 A1* | 5/2013 | Brown | .................... | H04L 9/001 380/28 |
| 2015/0117646 A1* | 4/2015 | Best | ...................... | H04W 12/08 380/270 |
| 2015/0301803 A1* | 10/2015 | Boenisch | .............. | H04L 9/0866 380/46 |
| 2020/0082060 A1* | 3/2020 | Steele | ..................... | G06F 21/14 |
| 2020/0145236 A1* | 5/2020 | Sethi | ..................... | H04L 9/3297 |
| 2020/0153625 A1* | 5/2020 | Schaap | ................. | H04L 9/0819 |

* cited by examiner

*Primary Examiner* — Matthew Smithers
(74) *Attorney, Agent, or Firm* — Finch & Maloney PLLC (57) ABSTRACT

A computer system is provided. The computer system includes a memory and at least one processor coupled to the memory and configured to measure one or more environmental factors; convert the one or more environmental factors to entropy values by truncation or rounding of the one or more environmental factors to a selected number of bits; and combine the entropy values to generate an encryption key. The one or more environmental factors may include a location of the computer system, a current date and time, parameters of a network environment to which the computer system is connected, or an identification of a server to which the computer system is connected. The at least one processor is further configured to encrypt and/or decrypt at least a portion of a data file and/or at least a portion of a binary executable application using the encryption key.

21 Claims, 6 Drawing Sheets

SYSTEM AND METHODS FOR ENCRYPTION BASED ON ENVIRONMENTAL FACTORS

BACKGROUND

Protecting data and applications on user devices (particularly mobile devices) is an increasingly important component of enterprise security. Some solutions involve encryption based on a user entered password or personal identification number (PIN). Other solutions use encryption based on a biometric approach such as facial recognition or fingerprint identification. These methods have their limitations, however. For example, weak passwords can often be guessed at, strong passwords can be stolen, and even biometric techniques can be spoofed.

SUMMARY

In at least one example, a computer system is provided. The computer system includes a memory; and at least one processor coupled to the memory and configured to: measure one or more environmental factors; convert the one or more environmental factors to one or more entropy values by transforming of the one or more environmental factors to a selected number of bits; and combine the entropy values to generate an encryption key.

At least some examples of the computer system can include one or more of the following features. The transforming of the one or more environmental factors includes truncating or rounding the one or more environmental factors to a selected number of bits. The one or more environmental factors include one or more of a location of the computer system, a current date and time, parameters of a network environment to which the computer system is connected, and an identification of a server to which the computer system is connected. The at least one processor can be configured to encrypt and/or decrypt at least a portion of a data file using the encryption key, thereby omitting a need to provide a password. The at least one processor is further configured to encrypt and/or decrypt at least a portion of a binary executable application using the encryption key, thereby omitting a need to provide a password. The at least one processor is further configured to perform the combining by concatenation of the entropy values or by summation of the entropy values. The at least one processor is further configured to obtain encryption configuration parameters from an administration server, the encryption configuration parameters to identify the one or more of the environmental factors. The at least one processor is further configured to determine if either: a data file should be encrypted using the encryption key; or a difference file should be created to capture edits made to the data file since a previous encryption based on environmental factors, the difference file to be encrypted using an alternate encryption technique, the alternate encryption technique not based on environmental factors.

In at least one example, a method for providing environmental based encryption is provided. The method includes measuring, by a computer system, one or more environmental factors; converting, by the computer system, the one or more environmental factors to one or more entropy values by transforming the one or more environmental factors to a selected number of bits; and combining, by the computer system, the entropy values to generate an encryption key.

At least some examples of the method can include one or more of the following features. The transforming of the one or more environmental factors includes truncating or rounding the one or more environmental factors to a selected number of bits. The one or more environmental factors include one or more of a location of the computer system, a current date and time, parameters of a network environment to which the computer system is connected, and an identification of a server to which the computer system is connected. The act of encrypting and/or decrypting at least a portion of a data file using the encryption key, thereby omitting a need to provide a password. The act of encrypting and/or decrypting at least a portion of a binary executable application using the encryption key, thereby omitting a need to provide a password. The act of performing the combining by concatenation of the entropy values or by summation of the entropy values. The act of obtaining encryption configuration parameters from an administration server, the encryption configuration parameters to identify the one or more of the environmental factors. The act of determining if either: a data file should be encrypted using the encryption key; or a difference file should be created to capture edits made to the data file since a previous encryption based on environmental factors, the difference file to be encrypted using an alternate encryption technique, the alternate encryption technique not based on environmental factors.

In at least one example, a non-transitory computer readable medium storing executable sequences of instructions to provide environmental based encryption is provided. The sequences of instructions include instructions to: measure one or more environmental factors; convert the one or more environmental factors to one or more entropy values by transforming the one or more environmental factors to a selected number of bits; and combine the entropy values to generate an encryption key.

At least some examples of the non-transitory computer readable medium can include one or more of the following features. The transforming of the one or more environmental factors includes truncating or rounding the one or more environmental factors to a selected number of bits. The one or more environmental factors include one or more of a location of the computer system, a current date and time, parameters of a network environment to which the computer system is connected, and an identification of a server to which the computer system is connected. Instructions to encrypt and/or decrypt at least a portion of a data file using the encryption key, thereby omitting a need to provide a password. Instructions to encrypt and/or decrypt at least a portion of a binary executable application using the encryption key, thereby omitting a need to provide a password. Instructions to perform the combining by concatenation of the entropy values or by summation of the entropy values. Instructions to obtain encryption configuration parameters from an administration server, the encryption configuration parameters to identify the one or more of the environmental factors. Instructions to determine if either: a data file should be encrypted using the encryption key; or a difference file should be created to capture edits made to the data file since a previous encryption based on environmental factors, the difference file to be encrypted using an alternate encryption technique, the alternate encryption technique not based on environmental factors.

Still other aspects, examples, and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

As noted previously, protecting data and applications on user devices is critical for enterprise security, and encryption is an important part of that process. This is particularly true for mobile devices such as smart phones, tablets, and laptops. User entered passwords or PINs, as well as biometric approaches based on facial recognition or fingerprint identification, can be used, but these methods all have their limitations. For example, weak passwords can be guessed at or otherwise broken, strong passwords are burdensome for the user to deal with and can be stolen. Biometric techniques offer some advantages, but even these can be circumvented through spoofing techniques.

To address these problems, and as summarized above, various examples described herein are directed to systems and methods for providing encryption based on environmental factors. In some examples, the environmental factors include elements of the environment in which the device is operating such as location, time of day, and network factors, to name a few. These environmental factors can be measured and converted into entropy values, as will be explained in greater detail below. The term "entropy," as used herein, is a measure of the state of the environment, to a desired degree of precision. This form of entropy can be associated with a relative level of unpredictability of an encryption key. That is to say, greater entropy is associated with a more secure encryption key. Because these forms of entropy (e.g., derived from the measured environmental factors) are not directly entered by the user, they provide greater security against theft and hacking, and can be more convenient to use.

In some examples, an EBE system measures environmental factors such as location and time of day. These factors are then converted to entropy values, for example, by truncating, rounding, or otherwise filtering the measured factors to a selected number of bits. The entropy values are then combined, by concatenation, summing, or any other suitable mathematical operation, to generate an environmentally based encryption key (an EBE key). The number of bits used for the entropy value is a tradeoff between EBE key strength and practical operation, as will be explained in greater detail below. The EBE system may then use the EBE key to encrypt and decrypt data and applications. The EBE key may be used with any suitable key-based encryption technique, in light of the present disclosure.

For example, a data file on a mobile device may be encrypted based on the fact that the mobile device is located in a particular conference room between the hours of 2 PM and 3 PM. The data file would then be readable (e.g., through EBE decryption) only in that conference room between the hours of 2 PM and 3 PM. As such, the user does not need to remember a password, and there is no opportunity for a password to be stolen, guessed at, or hacked. Additionally, if the user desires to share that file with another person, the user need only tell that person the location and time at which the file can be accessed. In some examples, even this can be done in a secure way, such as telling the other party to "check the files at your usual coffee time in your favorite café," for the case where the location is a known favorite coffee shop that is frequented at a known time.

While there is an inconvenience cost associated with this scheme (e.g., the need to be in a specific place at a specific time), that cost can be mitigated to some extent by encrypting the file using multiple sets of environmental factors, which in this example, would allow the file to be accessed at multiple locations and at multiple times that may be chosen for convenience or based on security concerns (e.g., locations considered to be safe). The locations and times would typically be limited in number and chosen with security considerations in mind, for example, locations frequented by people who are authorized to access the files.

As another example, the environmental factor may include the presence of (or relative distance to) a second device, which may be measured using radio frequency identification (RFID) techniques. The second device may be a smart watch, an Internet-of-Things (IoT) device, or any device with a serial number or tag that can be measured and identified by the mobile device employing the EBE system. In some examples, a Media Access Control (MAC) address of the second device may be used as the entropy value, and thus the physical presence of this second device in the vicinity of the mobile device effectively functions as the encryption key.

As another example, the environmental factors may include network factors such as any of the following: the Service Set Identifier (SSID) or other identifier of a network access point to which the mobile device is connected, the MAC address of the mobile device, an Internet Protocol (IP)

address resolution for a domain name, the ping time to a specified network location, or an SSID to a specified wireless network access point to which the mobile device is not necessarily connected, and/or an identifier of a mobile device management (MDM) server with which the mobile device is enrolled. It will be appreciated that these are just a few examples, and many other types of environmental factors may be employed by the EBE system.

As will be understood in view of this disclosure, the systems and methods for environmental based encryption provided herein have several advantages over existing methods which are generally limited to user-entered passwords. For instance, the systems and methods described herein avoid the need for the user to write down or otherwise store passwords that are difficult to remember, thus reducing the possibility of loss or theft. Because passwords are not required, the environmentally based encryption key can be very long and therefore more secure than an encryption key based on a password. Additionally, it will generally be difficult for an unauthorized or nefarious party to duplicate the necessary environmental conditions to decrypt a data file, even if those environmental conditions were known. For example, if the encryption key requires that the device be in a specific conference room at a specific time, it would be unlikely, although not impossible, that a remote hacker would be able to meet those conditions. To guard against this unlikely possibility, however, additional encryption may be employed using traditional passwords or other suitable techniques, as an extra layer of security, for example, in the most sensitive of applications.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Environmental Based Encryption System

Figure 1:
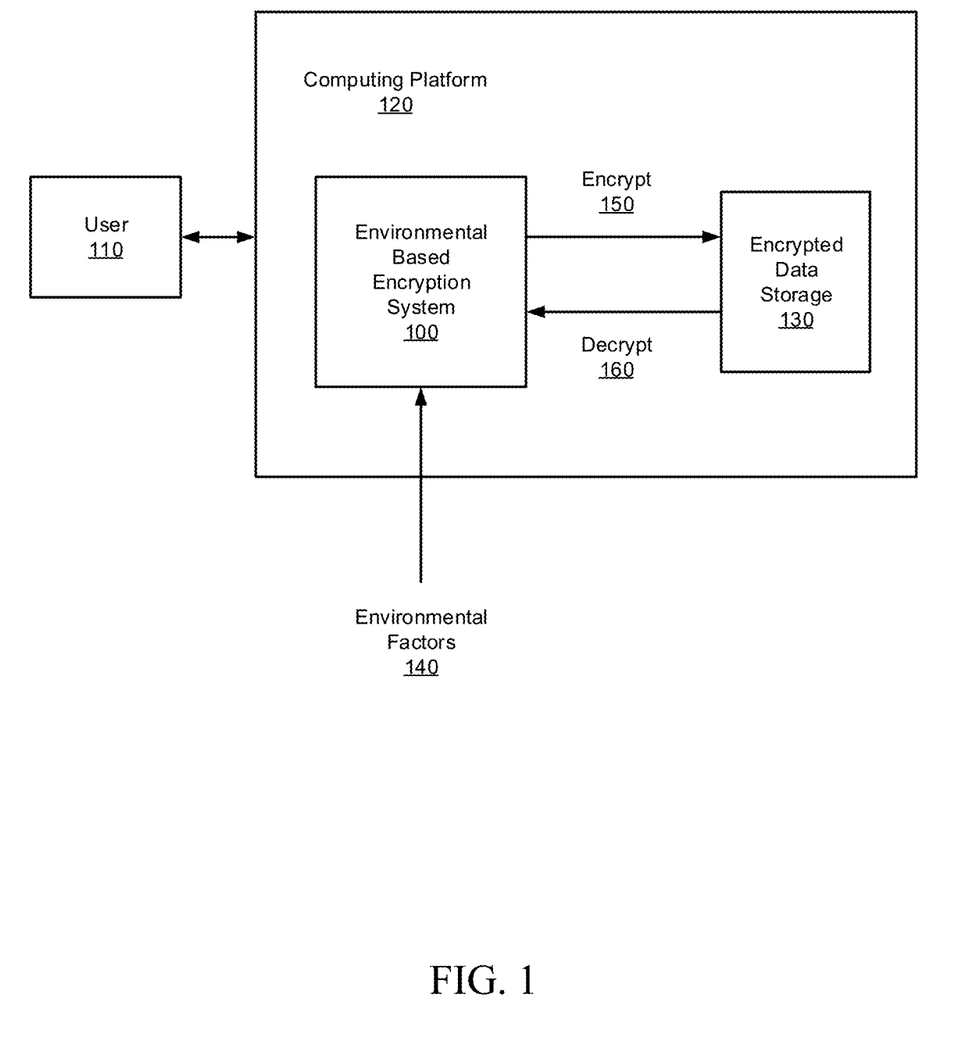
FIG. 1 is a top-level block diagram of an implementation of an environmental based encryption (EBE) system on a computing platform, in accordance with an example of the present disclosure.

FIG. 1 is a top-level block diagram of an implementation of an EBE system 100 on a computing platform 120, in accordance with an example of the present disclosure. In some examples, an EBE system 100 is configured to provide security for data and/or applications using key-based encryption techniques, wherein the encryption key is computed from measurable environmental factors 140. In some examples, the computing platform 120 may be a mobile device such as a smart phone, tablet, or laptop. In some examples, the computing platform 120 may be an IoT device. As shown in FIG. 1, the EBE system 100 performs encryption and decryption operations 150, 160 to manage access to encrypted data storage 130 by a user 110. In some examples, applications (e.g., binary executables, or parts thereof) may also be encrypted, as will be discussed in greater detail below.

Figure 2:
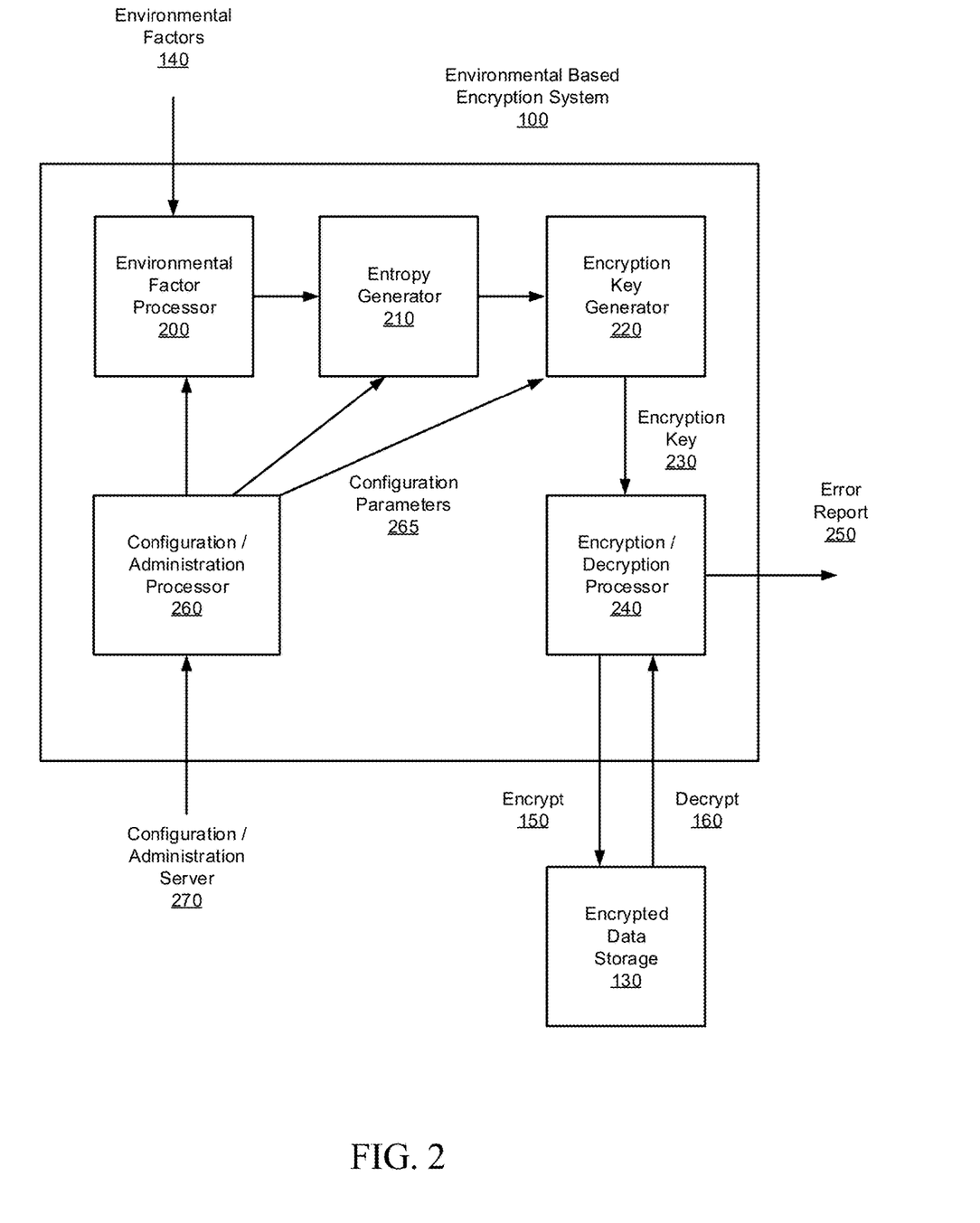
FIG. 2 is a block diagram of the EBE system, in accordance with an example of the present disclosure.

FIG. 2 is a block diagram of the EBE system 100 of FIG. 1, in accordance with an example of the present disclosure. EBE system 100 is shown to include environmental factor processor 200, entropy generator 210, encryption key generator 220, encryption/decryption processor 240, and configuration/administration processor 260.

Environmental factor processor 200 is configured to measure one or more environmental factors. These factors may include elements of the environment in which the computing platform 120 is operating such as location factors, temporal factors, network factors, connection to a specified server on a network, and inter-device factors, to name a few. It will be appreciated, however, that numerous other possibilities exist. Location factors may include longitude, latitude, and/or altitude. In some examples, location factors may be measured using a global positioning system (GPS) receiver. Temporal factors may also be measured using a GPS receiver, a clock, or other suitable timing device or circuit.

In some examples, network factors may include the SSID (or other identifier) of an attached network access point, the mobile devices current ID address or MAC address, IP address resolution for a specific domain name, the ping time to a specific network location, and/or the SSID (or other identifier) of a specified wireless network access point.

In some examples, the SSID (or other identifier) of a specified wireless network access point may be used as a network factor, even if not currently connected. For example, some operating systems may store lists of previously-connected access points. If these lists can be accessed, they can be checked for the presence of one or more networks to which the computing platform 120 has been previously connected, even if they are not connected at that instant. Such lists may contain identifying information for the access point such as an SSID.

The network factors may be measured using networking hardware and protocols, whether wired or wireless. In some examples, inter-device factors may include the presence of, or relative distance to, a specific device, or the serial number of a tag for an RFID device. Inter-device factors may be measured using RFID systems, or other suitable technology.

It will be appreciated that, in some examples, different combinations of environmental factors may be particularly useful, such as the combination of location factors and temporal factors, or the combination of location factors and network factors.

In some examples, the choice of environmental factors to be measured may be determined by the configuration/administration processor 260, which may be directed by a remote configuration/administration server 270, an information technology (IT) administrator of the computing platform 120, or the user 110 of FIG. 1.

Entropy generator 210 is configured to convert the environmental factors to entropy values by truncation, rounding, or otherwise filtering to a selected number of bits. In some examples, other suitable mathematical techniques may be applied to the environmental factors to generate entropy values of the selected number of bits. The number of bits used for the entropy value is a tradeoff between encryption key strength and practical operation. Each environmental factor possesses an inherent quantity of available entropy. For example, an SSID is typically 32 characters or 128 bits, while a MAC address is 48 bits, and the presence of a specific RFID device may translate to only a single bit. A greater number of bits has more entropy and may result in a more secure encryption key, however, there are practical limits to the size of the entropy values. For example, GPS may provide location accuracy on the order of 3 to 4 meters, but for real world usability, it may be best to round the location accuracy to a range of 10 to 20 meters, which corresponds to the size of a typical room. Similarly, time can be measured at millisecond accuracy, providing greater entropy, but it would not be feasible for the user to attempt to access the file in such a narrow time period. Thus, it would be more reasonable to round off the measured time to the order of many minutes or hours.

In some examples, the degree of truncation or rounding may be determined by the configuration/administration processor 260, in the same manner as described above in connection with the choice of environmental factors.

Encryption key generator 220 is configured to combine the entropy values to generate an environmental based encryption key. In some examples, the combining of entropy values may be accomplished through concatenation of the values, summation of the values, or through any suitable mathematical operation performed on those values. In some examples, the choice of the combining technique may also be determined by the configuration/administration processor 260.

Encryption/decryption processor 240 is configured to encrypt or decrypt a data file or application (or portion thereof) using the generated environmental based encryption key. In some examples, the encryption/decryption process may use any suitable key-based encryption process, including, for example, salting algorithms, iterative algorithms, and elliptic-curve cryptography, to name a few.

As previously described, configuration/administration processor 260 is configured to provide configuration parameters 265 to the environmental factor processor 200, the entropy generator 210, and the encryption key generator 220. These parameters 265 may control, for example, the specific environmental factors to be chosen, the number of bits of entropy to be used, and the specific encryption technique to be employed. In some examples, the parameters 265 may be provided by configuration/administration server 270, an IT administrator of the platform, or the user 110 of the platform.

Figure 6:
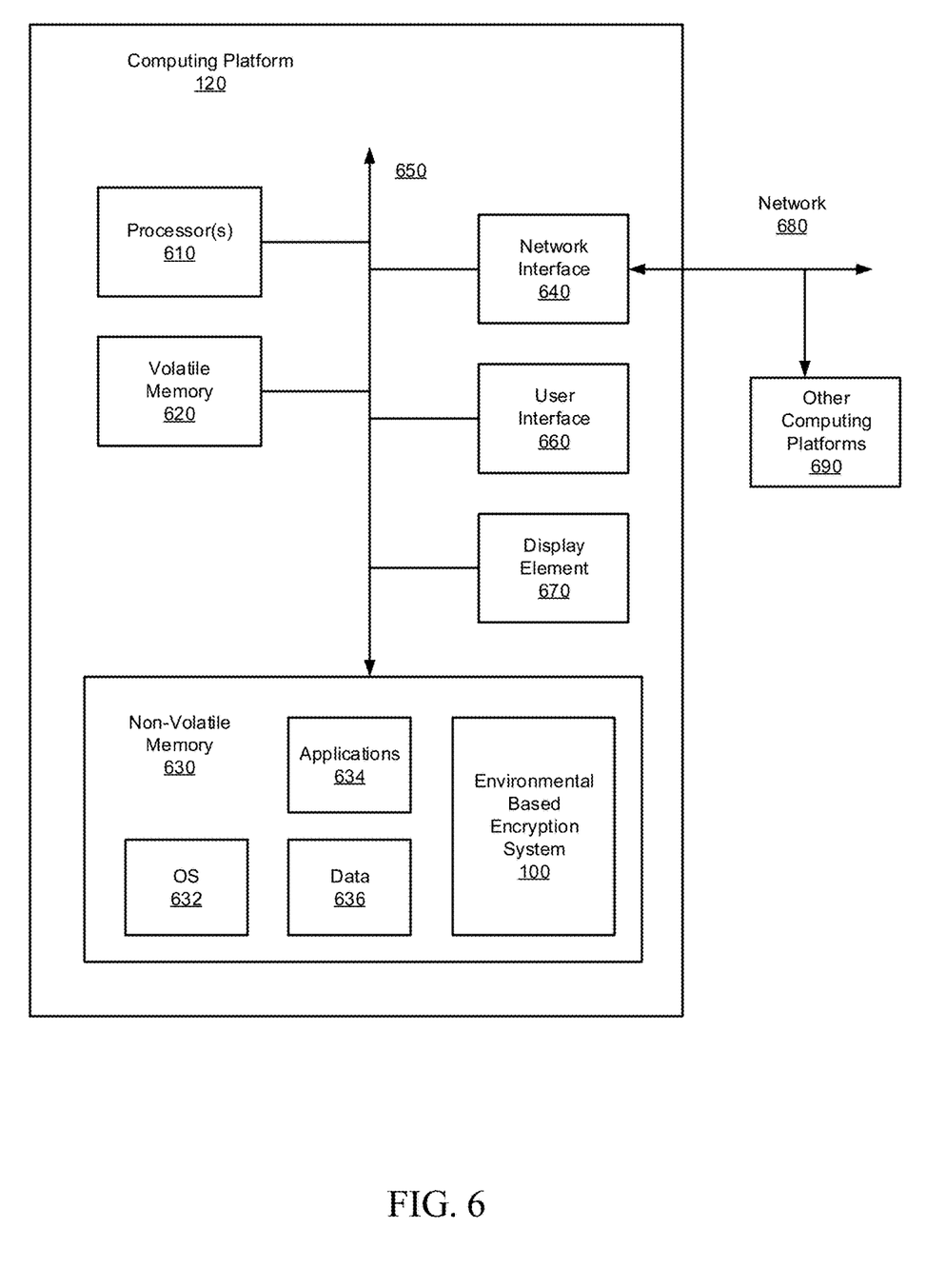
FIG. 6 is a block diagram of a computing platform configured to perform a process for EBE, in accordance with an example of the present disclosure.

In some examples, a user interface or graphical user interface, 660 of FIG. 6, may be provided and configured to allow the IT administrator or user to provide direction and parameters to the EBE system, or otherwise engage in dialog with the EBE system. Parameters may include, for example, the choice of environmental factors to be measured, the number of bits of entropy to be used, and the specific encryption technique to be used.

In some examples, multiple encryptions, using different sets of environmental factors, may be performed to improve accessibility and convenience for the user. This would allow, for example, multiple time ranges (e.g., 9 AM-10 AM and 2 PM-3 PM), or multiple locations (e.g., home office and work conference room), for which user access to the encrypted data or applications would be allowed.

Figure 3:
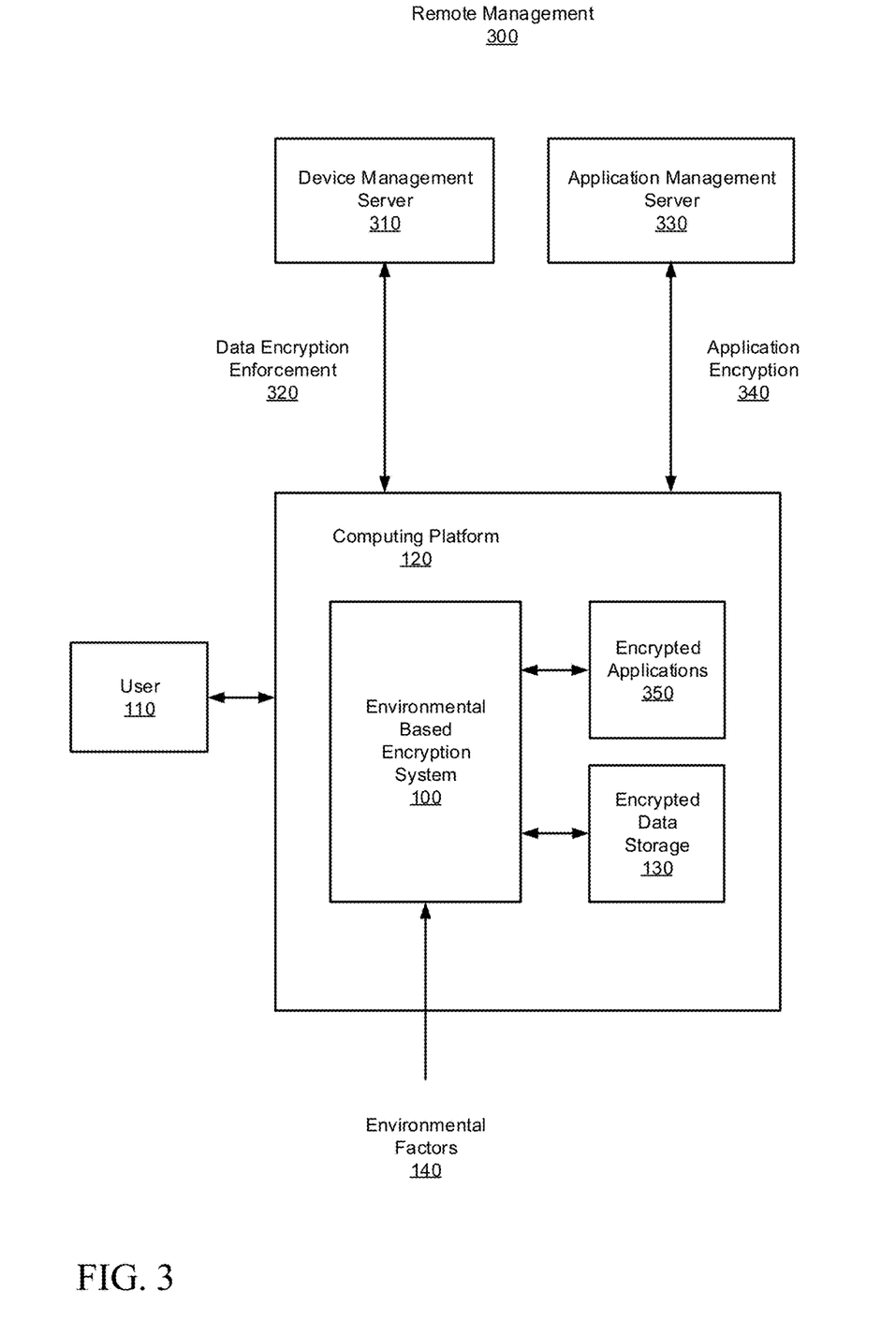
FIG. 3 illustrates remote management of the EBE system, in accordance with an example of the present disclosure.

FIG. 3 illustrates remote management 300 of the EBE system 100 of FIG. 1, in accordance with an example of the present disclosure. A device management server 310 and/or an application management server 330 may be coupled to the computing platform 120 of FIG. 1, as shown, for example through a network connection. In some examples, the device management server 310 is configured to manage various aspects of the computing platform 120, including security and data encryption policies. As such, the device management server 310 may provide data encryption enforcement 320 that includes a mandate for performance of environmental based encryption, by EBE system 100, of data and data files to be stored in encrypted data storage 130, using the techniques as previously described. In some examples, wrapping techniques may be used to modify existing binary executables (without requiring a complete rebuild of the executables), to incorporate the EBE techniques described above into existing applications for deployment on the computing platform 120 of FIG. 1.

In some examples, application management server 330 is configured to provide environmental based encryption, using EBE system 100, of applications 340 to be executed on computing platform 120. The application management server 330 may provide software development tools or a software development kit (SDK). The SDK may include, for example, an application programming interface (API) that a software developer can use in the development of software applications. The developer may incorporate calls to the API, in their software, to implement EBE functionality in the application. For example, a binary executable of an application may contain 9 Megabytes of data and 1 Megabyte of loader code, and the data portion may be encrypted using the EBE techniques described previously while the loader code portion can remain unencrypted. When the application is executed, the EBE functionality incorporated into that application, through the API calls, may then prevent access to the encrypted data portion unless the appropriate environmental factors are met. The encryption of the data portion may therefore defeat attempts at theft of the application.

Environmental Based Encryption Processes

As described above, some examples of the EBE system 100 of FIG. 1 are configured to provide encryption of data and applications, based on environmental factors which can be measured, and which do not require any explicit input from the user, such as strong passwords which can be difficult to remember. The processes may be executed on a processor of any suitable type (e.g., processor(s) 610 of FIG. 6).

Figure 4:
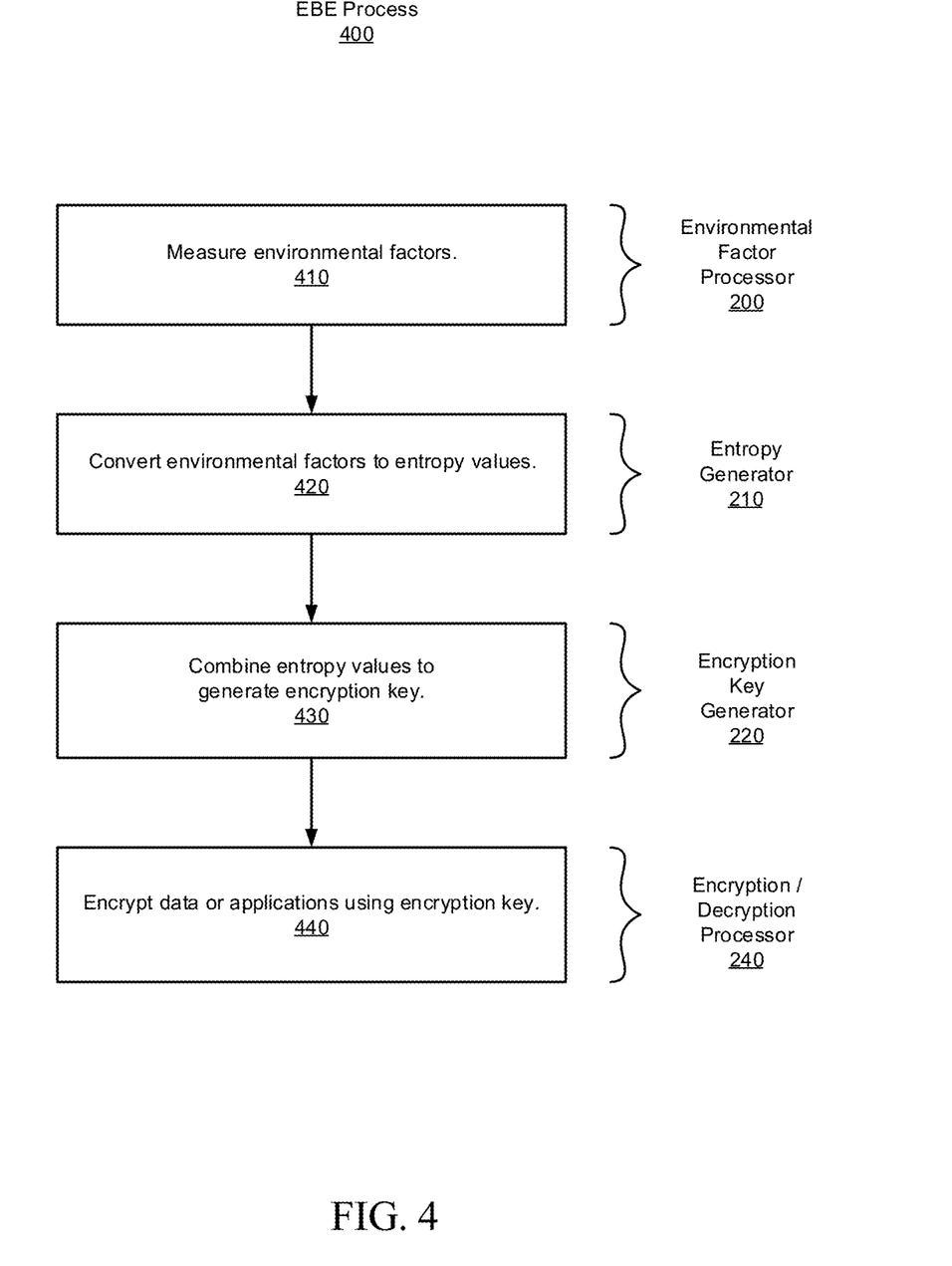
FIG. 4 is a flow diagram of a process for EBE, in accordance with an example of the present disclosure.

FIG. 4 is a flow diagram of a process 400 for EBE, in accordance with an example of the present disclosure. At operation 410, an environmental factor processor 200, of FIG. 2, measures one or more selected environmental factors in which the computing system/platform is operating. In some examples, the environmental factors may include one or more of a location of the computer system, a current date and time, parameters of a network environment to which the computer system is connected, and an identification of a server to which the computer system is connected.

At operation 420, the environmental factors are converted to entropy values by truncation, rounding, or filtering (or other suitable mathematical operation) to a selected number of bits, for example by entropy generator 210 of FIG. 2.

At operation 430, the entropy values are combined to generate an encryption key, for example by encryption key generator 220 of FIG. 2. In some examples, the combining is accomplished through the concatenation or summation of the entropy values, or through any other suitable mathematical operation that may be performed on the entropy values.

At operation 440, data and/or applications are encrypted and/or decrypted using the environmental based encryption key, for example by encryption/decryption processor 240 of FIG. 2. In some examples, at least a portion of a data file or a portion of a binary executable application is encrypted or decrypted using the environmental based encryption key.

Figure 5:
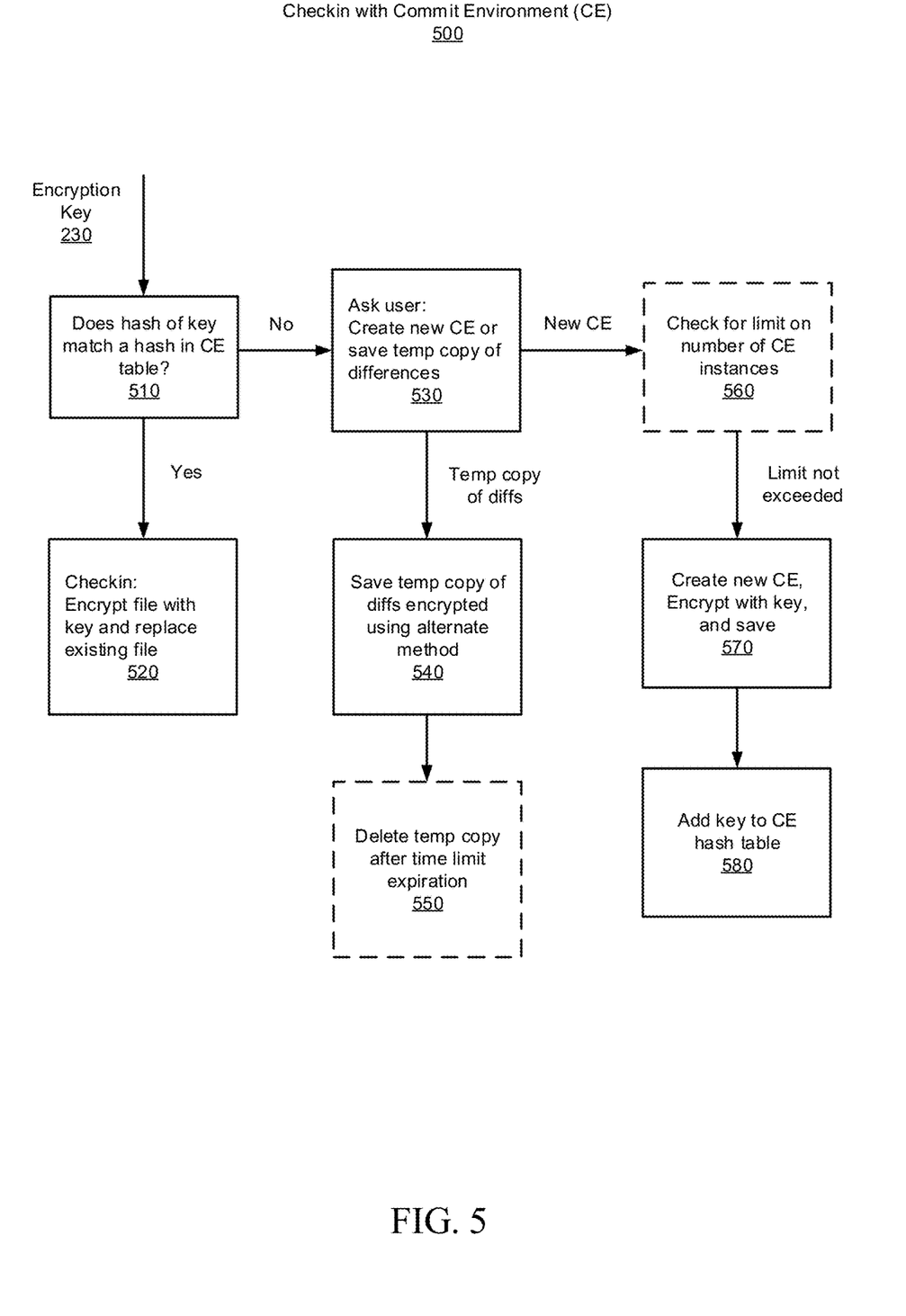
FIG. 5 is a flow diagram of a process for data file check-in with optional commitment using EBE, in accordance with an example of the present disclosure.

FIG. 5 is a flow diagram 500 of a process for data file check-in with optional commitment using EBE, in accordance with an example of the present disclosure. Because encryption keys can change frequently, it may be inconvenient to encrypt data each time a file is modified. For this reason, in some examples, EBE may be implemented under a check-in/check-out paradigm in which there is a distinction between saving a modified data file, and subsequently "committing" the changes so that they are encrypted using EBE. Changes that are not committed can still be encrypted, however, using a simpler or more traditional encryption key (e.g., a key that is based on a password). In some examples, the user may be required to commit the changes using EBE after a certain period of time has elapsed.

To facilitate the check-in/check-out process, one or more "commit environments" (CEs) can be created. A CE represents a combination of environmental factors that result in an encryption key that has been used before. For example, if the user wants to employ a certain conference room as a CE, then when the user encrypts a file for the first time, the EBE system will record that CE as a hash of the encryption key generated from the environmental factors associated with that conference room. To maintain security, neither the encryption key, nor the environmental factors used to generate the key, are stored, only the hash is stored. The process may be repeated for multiple locations/environments that the user wishes to designate as CEs, and a table of hash values may be maintained, each entry created as a hash of the encryption key that was generated from the environmental factors associated with that CE.

At a future point in time, when the environmental factors change, the user will no longer be in a given CE. If, at that point, the user wants to save the file, they will have the option to create a new CE for their current environmental factors and encrypt the file under that CE, or to temporarily save a difference or delta of their changes using a simpler encryption key. In the event that security of the temporary file is compromised, only the differences will be exposed, not the entire data file.

While an unlimited number of CEs may be created and used, in some examples the number may be limited to a relatively smaller number (e.g., less than 5) due to practical/operational constraints.

To this end, as illustrated in FIG. 5, at operation 510, a hash of the encryption key 230, of FIG. 2, is compared to entries in a CE table (e.g., hashes of encryption keys for each CE) to determine if there is a match.

At operation 520, if there is a match, then the encryption key is valid and the data file is checked-in by encrypting the file with the key 230, and replacing the existing file. At operation 530, if there is not a match, the user is asked whether to create a new CE or to save a temporary copy of the differences between the current data file and the previous version of the data file.

At operation 540, if the user chose not to create a new CE, the temporary copy of the differences is encrypted using an alternate encryption method and then saved. At operation 550, the temporary copy may optionally be deleted after the expiration of a selected time limit. In some examples, the user may be warned before the temporary copy is deleted, for example through a message displayed on a display element 670 of FIG. 6, of the computing platform 120 of FIG. 1. In some examples, the EBT system 100 may engage in a dialogue with the user through a user interface 660 of FIG. 6 and display element 670 to determine if the temporary copy should be deleted.

At operation 560, if the user chose to create a new CE, a check is performed to determine if a limit on the number of CE instances will be exceeded. At operation 570, if the limit is not exceeded, a new CE is created and the data file is encrypted with a new key, associated with that CE, and saved. At operation 580, a hash of the new key is added to the CE hash table.

For the data file check-out process, a hash of the encryption key 230 is compared to entries in a CE table to determine if there is a match. If there is a match, the encryption key 230 can be used to decrypt the data file, which is then considered to be checked out. If there is not a match, the encryption key 230 is not valid for any of the CEs in the table, and any attempt to use that key to decrypt the file will fail (e.g., the data will be unusable/unreadable). In some examples, the EBE system may report this to the user for, example through a message displayed on display element 670.

Computing Platform for Environmental Based Encryption

FIG. 6 is a block diagram of a computing platform 120, of FIG. 1, configured to perform a process for EBE, in accordance with an example of the present disclosure. In some cases, the platform 120 may be a mobile device, as previously described in connection with FIG. 1.

The computing platform or device 120 includes one or more processors 610, volatile memory 620 (e.g., random access memory (RAM)), non-volatile memory 630, one or more network or communication interfaces 640, a user interface (UI) 660, a display element or screen 670, and a communications bus 650. The computing platform 120 may also be referred to as a computer or a computer system.

The non-volatile (non-transitory) memory 630 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The display element 670 can provide a graphical user interface (GUI) and in some cases, may be a touchscreen or any other suitable display device. The UI 660 can include one or more input/output (I/O) devices (e.g., a mouse, a keyboard, a microphone, a camera, one or more speakers, one or more biometric scanners, one or more environmental sensors, and one or more accelerometers, etc.).

The non-volatile memory 630 stores an operating system 632, one or more applications 634, data 636, and EBE system 100 of FIG. 1, such that, for example, computer instructions of the operating system 632, the applications 634, and the EBE system 100, are executed by processor(s) 610 out of the volatile memory 620. In some examples, the volatile memory 620 can include one or more types of RAM and/or a cache memory that can offer a faster response time than a main memory. Data can be entered through the UI 660 or received from the other devices. Data files to be encrypted (or that have been decrypted) may be displayed through user interface 660 for presentation to the user on display element 670. Various elements of the computing platform 120 can communicate via the communications bus 650.

The illustrated computing platform 120 is shown merely as an example client device and can be implemented by any computing or processing environment with any type of machine or set of machines that can have suitable hardware and/or software capable of operating as described herein.

The processor(s) 610 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 610 can be analog, digital or mixed. In some examples, the processor 610 can be one or more physical processors. In some examples, the physical processors may be remotely located or cloud-based processors. A processor including multiple processor cores and/or multiple processors can provide functionality for parallel, simultaneous execution of instructions or for parallel, simultaneous execution of one instruction on more than one piece of data.

The network interfaces 640 can include one or more interfaces to enable the computing platform 120 to access a computer network 680 such as a Local Area Network (LAN), a Wide Area Network (WAN), a Personal Area Network (PAN), or the Internet through a variety of wired and/or wireless connections, including cellular connections. In some examples, the network 680 may allow for communication with other computing platforms 690, to enable distributed computing. In some examples, the network 680 may allow for communication with other servers such as device management server 310 and/or application management server 330, both of FIG. 3.

In described examples, the computing platform 120 can execute an application on behalf of a user of a client device. For example, the computing platform 120 can execute one or more virtual machines managed by a hypervisor. Each virtual machine can provide an execution session within which applications execute on behalf of a user or a client device, such as a hosted desktop session. The computing platform 120 can also execute a terminal services session to provide a hosted desktop environment. The computing platform 120 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A computer system comprising:
   a memory; and
   at least one processor coupled to the memory and configured to:
     measure one or more environmental factors;
     convert the one or more environmental factors to one or more entropy values by transforming of the one or more environmental factors to a selected number of bits by truncating or rounding the one or more environmental factors to the selected number of bits; and
     combine the entropy values to generate an encryption key.

2. The computer system of claim 1, wherein the one or more environmental factors include one or more of a location of the computer system, a current date and time, parameters of a network environment to which the computer system is connected, and an identification of a server to which the computer system is connected.

3. The computer system of claim 1, wherein the at least one processor is further configured to encrypt and/or decrypt at least a portion of a data file using the encryption key, thereby omitting a need to provide a password.

4. The computer system of claim 1, wherein the at least one processor is further configured to encrypt and/or decrypt at least a portion of a binary executable application using the encryption key, thereby omitting a need to provide a password.

5. The computer system of claim 1, wherein the at least one processor is further configured to perform the combining by concatenation of the entropy values or by summation of the entropy values.

6. The computer system of claim 1, wherein the at least one processor is further configured to obtain encryption configuration parameters from an administration server, the encryption configuration parameters to identify the one or more of the environmental factors.

7. The computer system of claim 1, wherein the at least one processor is further configured to determine if either:
   a data file should be encrypted using the encryption key; or
   a difference file should be created to capture edits made to the data file since a previous encryption based on environmental factors, the difference file to be encrypted using an alternate encryption technique, the alternate encryption technique not based on environmental factors.

8. A method for providing environmental based encryption comprising:
   measuring, by a computer system, one or more environmental factors;
   converting, by the computer system, the one or more environmental factors to one or more entropy values by transforming the one or more environmental factors to a selected number of bits by truncating or rounding the one or more environmental factors to the selected number of bits; and
   combining, by the computer system, the entropy values to generate an encryption key.

9. The method of claim 8, wherein the one or more environmental factors include one or more of a location of the computer system, a current date and time, parameters of a network environment to which the computer system is connected, and an identification of a server to which the computer system is connected.

10. The method of claim 8, further comprising encrypting and/or decrypting at least a portion of a data file using the encryption key, thereby omitting a need to provide a password.

11. The method of claim 8, further comprising encrypting and/or decrypting at least a portion of a binary executable application using the encryption key, thereby omitting a need to provide a password.

12. The method of claim 8, further comprising performing the combining by concatenation of the entropy values or by summation of the entropy values.

13. The method of claim 8, further comprising obtaining encryption configuration parameters from an administration server, the encryption configuration parameters to identify the one or more of the environmental factors.

14. The method of claim 8, further comprising determining if either:
- a data file should be encrypted using the encryption key; or a difference file should be created to capture edits made to the data file since a previous encryption based on environmental factors, the difference file to be encrypted using an alternate encryption technique, the alternate encryption technique not based on environmental factors.

15. A non-transitory computer readable medium storing executable sequences of instructions to provide environmental based encryption, the sequences of instructions comprising instructions to:
- measure one or more environmental factors;
- convert the one or more environmental factors to one or more entropy values by transforming the one or more environmental factors to a selected number of bits by truncating or rounding the one or more environmental factors to the selected number of bits; and
- combine the entropy values to generate an encryption key.

16. The computer readable medium of claim 15, wherein the one or more environmental factors include one or more of a location of the computer system, a current date and time, parameters of a network environment to which the computer system is connected, and an identification of a server to which the computer system is connected.

17. The computer readable medium of claim 15, wherein the sequences of instructions further include instructions to encrypt and/or decrypt at least a portion of a data file using the encryption key, thereby omitting a need to provide a password.

18. The computer readable medium of claim 15, wherein the sequences of instructions further include instructions to encrypt and/or decrypt at least a portion of a binary executable application using the encryption key, thereby omitting a need to provide a password.

19. The computer readable medium of claim 15, the sequences of instructions further include instructions to perform the combining by concatenation of the entropy values or by summation of the entropy values.

20. The computer readable medium of claim 15, wherein the sequences of instructions further include instructions to obtain encryption configuration parameters from an administration server, the encryption configuration parameters to identify the one or more of the environmental factors.

21. The computer readable medium of claim 15, wherein the sequences of instructions further include instructions to determine if either:
- a data file should be encrypted using the encryption key; or
- a difference file should be created to capture edits made to the data file since a previous encryption based on environmental factors, the difference file to be encrypted using an alternate encryption technique, the alternate encryption technique not based on environmental factors.

\* \* \* \* \*